(12) United States Patent
Powell

(10) Patent No.: US 10,042,942 B2
(45) Date of Patent: Aug. 7, 2018

(54) TRANSFORMS USING COLUMN DICTIONARIES

(71) Applicant: SAP SE, Walldorf (DE)

(72) Inventor: Jeff Powell, Holmen, WI (US)

(73) Assignee: SAP SE, Walldorf (DE)

( * ) Notice: Subject to any disclaimer, the term of this patent is extended or adjusted under 35 U.S.C. 154(b) by 349 days.

(21) Appl. No.: 14/927,617

(22) Filed: Oct. 30, 2015

(65) Prior Publication Data
US 2017/0124198 A1  May 4, 2017

(51) Int. Cl.
*G06F 17/30* (2006.01)

(52) U.S. Cl.
CPC .. *G06F 17/30867* (2013.01); *G06F 17/30339* (2013.01)

(58) Field of Classification Search
USPC .................................................. 707/706, 769
See application file for complete search history.

(56) References Cited

U.S. PATENT DOCUMENTS

| | | | | |
|---|---|---|---|---|
| 6,604,095 B1 * | 8/2003 | Cesare | ............. | G06F 17/30595 |
| 6,748,389 B1 * | 6/2004 | Cesare | ............. | G06F 17/30569 |
| | | | | 707/809 |
| 9,786,020 B2 * | 10/2017 | Forbes, Jr. | ............. | G05D 17/00 |
| 9,798,752 B1 * | 10/2017 | Naffziger | .......... | G06F 17/30315 |
| 9,798,801 B2 * | 10/2017 | Rezaei | ............. | G06F 17/30684 |
| 9,799,084 B2 * | 10/2017 | Forbes, Jr. | ............. | G05D 17/00 |
| 9,804,625 B2 * | 10/2017 | Forbes, Jr. | ............. | G05F 1/66 |
| 9,826,251 B2 * | 11/2017 | Lee | ........................ | H04N 19/61 |
| 9,832,464 B2 * | 11/2017 | Lee | ...................... | H04N 19/107 |

* cited by examiner

*Primary Examiner* — Kim Nguyen
(74) *Attorney, Agent, or Firm* — Buckley, Maschoff & Talwalkar LLC

(57) ABSTRACT

A system includes acquisition of values of a plurality of columns of a first record of a set of records, generation of a first output based on the values, association of the first output with the first record, identification of a first one or more records of the set of records which include the value of a first column of the plurality of columns of the first record, identification of a second one or more records of the set of records which include the value of a second column of the plurality of columns of the first record, determination of a first intersection of records between the first one or more records and the second one or more records, identification of a third one or more records of the set of records which include the value of a third column of the plurality of columns of the first record, and determination of a second intersection of records between the first intersection of records and the third one or more records.

18 Claims, 9 Drawing Sheets

| F_Name | L_Name |
|---|---|
| Jeff | Smith |
| Joe | Jones |
| Jane | Smith |
| Tim | Hanson |
| Jeff | Smith |
| Tim | Jones |

*FIG. 2A*

| # | Name | |
|---|---|---|
| 1 | Jeff | (2x, row1, row5) |
| 2 | Joe | (1x, row2) |
| 3 | Jane | (1x, row3) |
| 4 | Tim | (2x, row4, row6) |

*FIG. 2B*

| 24 |
|---|
| 1 |
| 2 |
| 3 |
| 4 |
| 1 |
| 4 |

*FIG. 2C*

| Name | |
|---|---|
| Smith | (3x, row1, row3, row5) |
| Jones | (2x, row2, row6) |
| Hanson | (1x, row4) |

*FIG. 2D*

| 28 |
|---|
| 1 |
| 2 |
| 1 |
| 3 |
| 1 |
| 2 |

*FIG. 2E*

TRANSFORMS USING COLUMN DICTIONARIES

BACKGROUND

Enterprise database systems store vast amounts of data received from one or more different sources. This data is typically stored in records of relational database tables. In order to standardize the data and/or to complete partial records, the records may be subjected to various types of transforms.

Generally, a transform generates a set of output records from a set of input records. The input records and the output records may or may not exhibit different schemas. The input records are typically processed sequentially and, consequently, the processing cost of executing any particular transform increases in proportion with the number of input records.

BRIEF DESCRIPTION OF THE DRAWINGS

FIG. 2A is a tabular representation of a database table.

FIG. 2B is a tabular representation of a column dictionary according to some embodiments.

FIG. 2C is a tabular representation of stored indexes of a database table column according to some embodiments.

FIG. 2D is a tabular representation of a column dictionary according to some embodiments.

FIG. 2E is a tabular representation of stored indexes of a database table column according to some embodiments.

DETAILED DESCRIPTION

The following description is provided to enable any person in the art to make and use the described embodiments. Various modifications, however, will remain readily apparent to those in the art.

Figure 1:
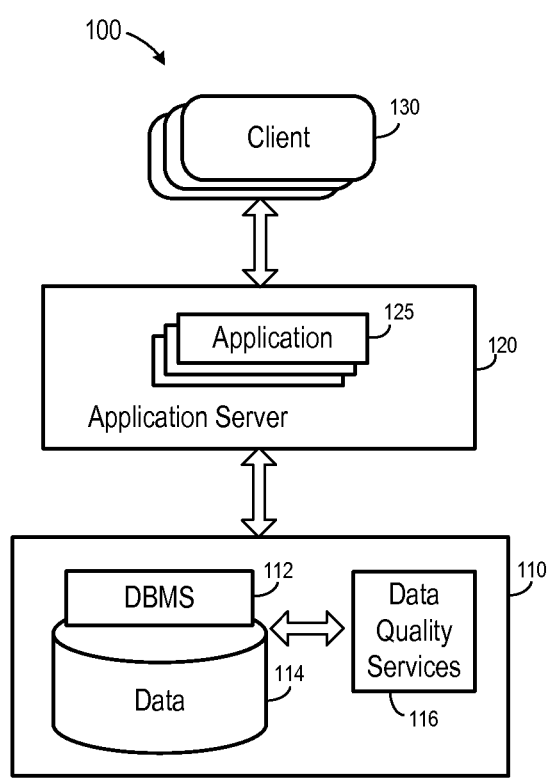
FIG. 1 is a block diagram of a database architecture according to some embodiments.

FIG. 1 is a block diagram of database architecture 100 according to some embodiments. Embodiments are not limited to architecture 100 or to a database architecture. Architecture 100 includes database 110, application server 120 and clients 130.

Application server 120 executes and provides services to applications 125. Applications 125 may comprise server-side executable program code (e.g., compiled code, scripts, etc.) which provide functionality to clients 130 by providing user interfaces to clients 130, receiving requests from clients 130 via such user interfaces, retrieving data from database 110 based on the requests, processing the data received from database 110, and providing the processed data to clients 130. Applications 125 executing within application server 120 may also expose administrative functions to clients 130, including but not limited to data quality services as will be described below. Applications 125 may be made available for execution by application server 120 via registration and/or other procedures which are known in the art.

Application server 120 provides any suitable interfaces through which clients 130 may communicate with applications 125 executing on application server 120. For example, application server 120 may include a HyperText Transfer Protocol (HTTP) interface supporting a transient request/response protocol over Transmission Control Protocol (TCP), a WebSocket interface supporting non-transient full-duplex communications between application server 120 and any clients 130 which implement the WebSocket protocol over a single TCP connection, and/or an Open Data Protocol (OData) interface.

Database 110 comprises database management system (DBMS) 112, data 114 and data quality services 116. One or more applications 125 executing on server 120 may communicate with DBMS 112 using database management interfaces such as, but not limited to, Open Database Connectivity (ODBC) and Java Database Connectivity (JDBC) interfaces. These types of applications 125 may use Structured Query Language (SQL) to manage, modify and query data stored in database 110.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. Data 114 may be distributed among several relational databases, dimensional databases, and/or other data sources. Embodiments are not limited to any number or types of data sources.

DBMS 112 serves requests to retrieve and/or modify data 114, and also performs administrative and management functions. Such functions may include snapshot and backup management, indexing, optimization, garbage collection, and/or any other database functions that are or become known. Database 110 may also provide application logic, such as database procedures and/or calculations, according to some embodiments. This application logic may comprise scripts, functional libraries and/or compiled program code.

In some embodiments, data 114 may comprise one or more of conventional tabular data, row-based data, column-based data, and object-based data. Data 114 may be indexed and/or selectively replicated in an index to allow fast searching and retrieval thereof. Database 110 may support multi-tenancy to separately support multiple unrelated clients by providing multiple logical database systems which are programmatically isolated from one another.

Data 114 may also store metadata regarding the structure, relationships and meaning of the data stored within data 114. This information may include data defining the schema of database tables stored within data 114. A database table schema may specify the name of the database table, columns of the database table, the data type associated with each column, and other information associated with the database table.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data quality services 116 may comprise functions to selectively process data of data 114. These functions may include, but are not limited to, data cleansing, data matching, best record identification, semantic profiling and data enrichment functions. These functions may be exposed to applications 125 via the OData protocol, and thereby available to clients 130 for direct initiation or as underlying processes of an algorithm executed by an application 125.

Application server 120 may be separated from or closely integrated with database 110. A closely-integrated application server 120 may enable execution of server applications 125 completely on database 110, without the need for an additional application server. For example, according to some embodiments, database 110 includes a comprehensive set of embedded services which provide end-to-end support for Web-based applications. The services may include a lightweight web server, configurable support for OData, server-side JavaScript execution and access to SQL and SQLScript.

Each of clients 130 may comprise one or more devices executing program code of a software application for presenting user interfaces to allow interaction with application server 120. The user interfaces may comprise user interfaces suited for reporting, data analysis, and/or any other functions based on data 114.

Presentation of a user interface as described herein may comprise any degree or type of rendering, depending on the type of user interface code generated by application server 120. For example, a client 130 may execute a Web Browser to request and receive a Web page (e.g., in HTML format) from application server 120 via HTTP, HTTPS, and/or WebSocket, and may render and present the Web page according to known protocols. One or more of clients 130 may also or alternatively present user interfaces by executing a standalone executable file (e.g., an .exe file) or code (e.g., a JAVA applet) within a virtual machine.

As described above, database 110 may store column-based data, in which data of a database table column is stored in consecutive memory locations. According to some embodiments, each database table column is associated with a dictionary. For purposes of example, FIG. 2A is a tabular representation of a portion of database table 20. The illustrated portion of table 20 includes two columns (i.e., F_Name, L_Name) and six records. Embodiments are not limited to the schema of table 20 or to this number of records.

FIG. 2B illustrates dictionary 22 corresponding to column F_Name of table 20. Dictionary 22 includes one and only one entry for each unique data value of column F_Name. Also, each entry is associated with metadata indicating the number of occurrences (i.e., "#x") of the entry in column F_Name and the rows of column F_Name in which the entry occurs. Finally, each entry is associated with an index which points to the entry.

FIG. 2C illustrates usage of such indexes according to some embodiments. Memory locations 24 show consecutively-stored values representing the values of column F_Name according to some embodiments. More specifically, each stored value points to a row of dictionary 22. As a result, the values of locations 24 represent the data of column F_Name of table 20. Data 114 may therefore comprise memory locations storing consecutive index values for a column, rather than storing the actual column data values. This arrangement reduces the amount of memory needed to store column data values and is also amenable to data compression, since the consecutively-stored values of a column may contain many repetitive values.

FIG. 2D illustrates dictionary 26 corresponding to column L_Name of table 20. Dictionary 26 also includes one entry for each unique data value of column L_Name, which is associated with metadata as described above. Memory locations 28 show consecutively-stored values representing the values of column L_Name according to some embodiments, where each stored value points to a row of dictionary 26.

Figure 3A:
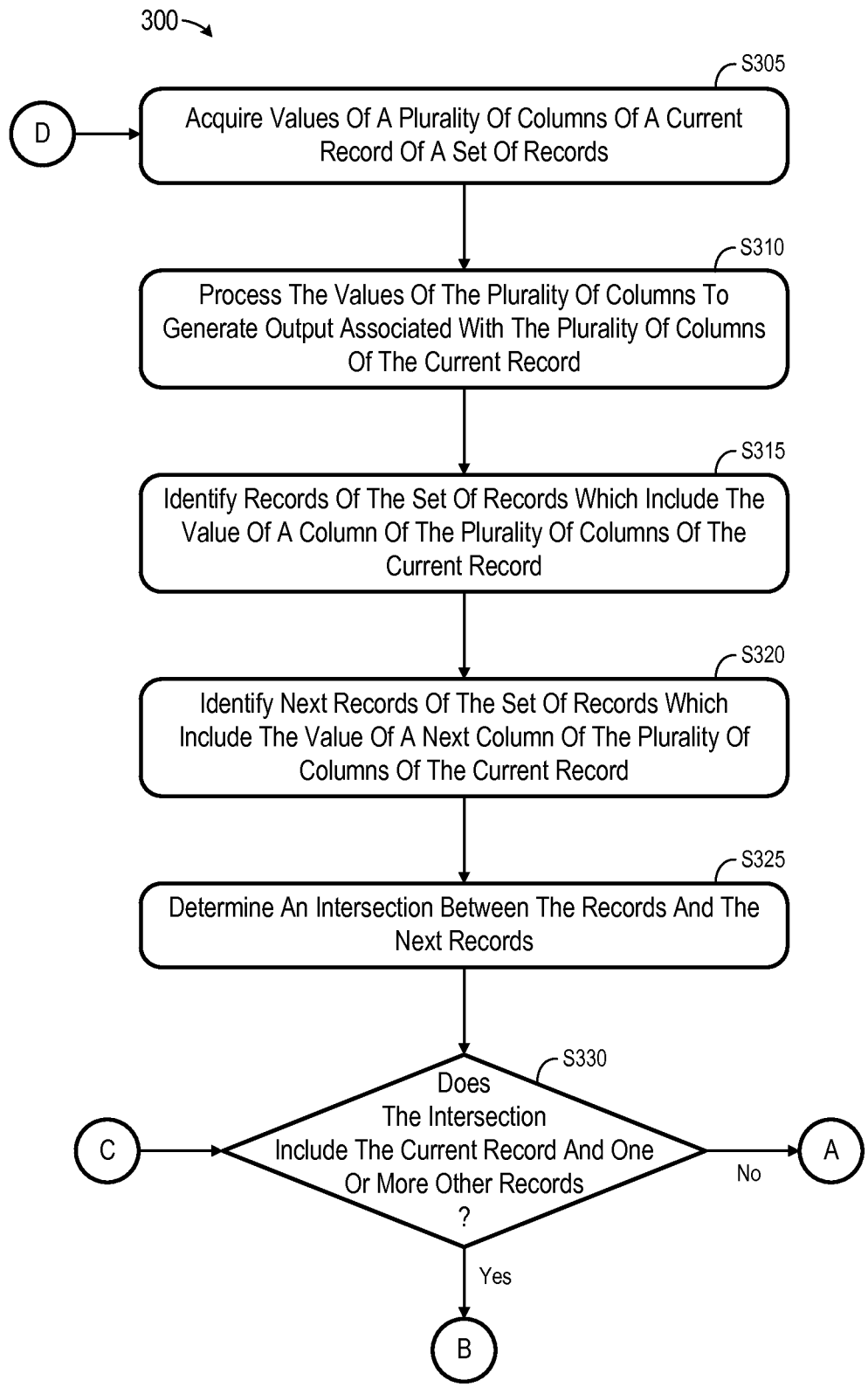
FIGS. 3A and 3B comprise a flow diagram of a process according to some embodiments.
Figure 3B:
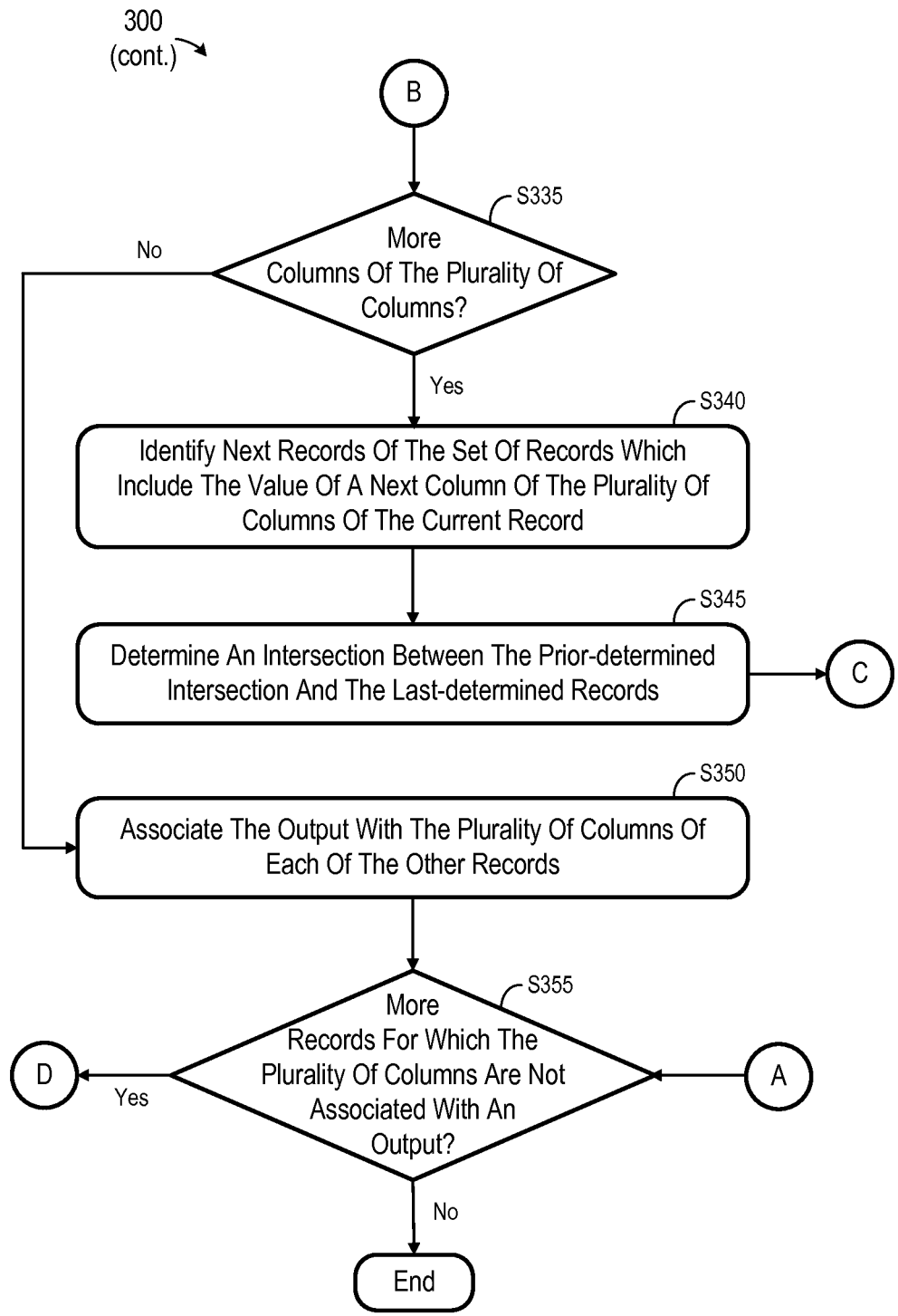

FIGS. 3A and 3B comprise a flow diagram of process 300 according to some embodiments. Process 300 may facilitate the application of data transforms to table records according to some embodiments. In some embodiments, various hardware elements of architecture 100 (e.g., one or more processors) execute program code to perform process 300. The program code may be implemented within data quality services 116 according to some embodiments.

Process 300 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S305, values of a plurality of columns of a current record are acquired. The plurality of columns may comprise all the columns of the current record or a subset thereof. The current record is one of a set of records, all of which are to be subjected to one or more transforms.

The acquisition of values at S305 may be responsive to a command received from a user. For example, a client device 130 may access a data preparation application 125 and may present user interfaces thereof. A user may manipulate the user interfaces in order to select a set of records (e.g., all records) of a database table of data 114, a plurality of columns of the records (e.g., columns associated with a person's name), and one or more transforms to apply to those columns of the set of records. Non-exhaustive examples of transforms include data standardization and data enrichment.

In the foregoing description, it will be assumed that the six records and two columns of FIG. 2A have been selected for processing. Accordingly, at S305, values of the two columns F_Name and L_Name are acquired for a first record of table 20. These values are "Jeff" and "Smith". These values are processed at S310 to generate an output associated with the columns F_Name and L_Name and the first record.

Figure 4A:
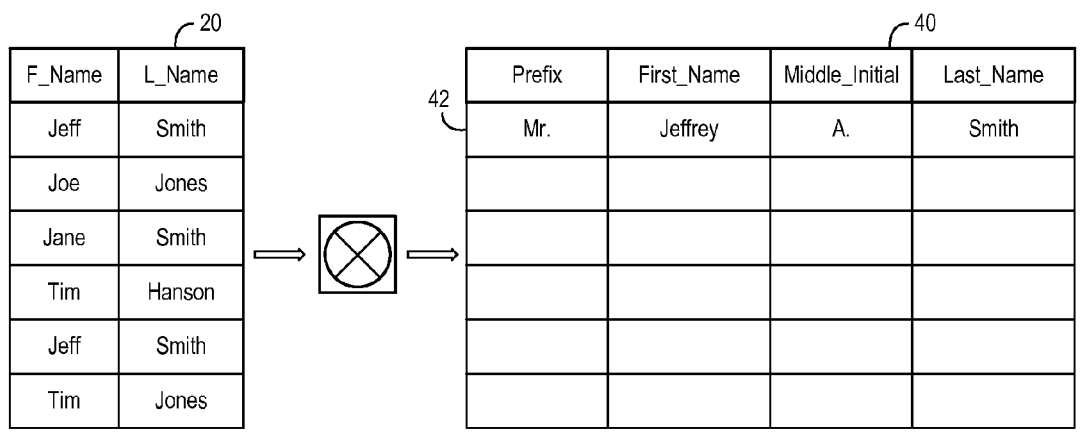
FIGS. 4A through 4D illustrate data transformation according to some embodiments.

FIG. 4A depicts processing the values of the two columns of the first record of table 20 according to some embodiments of S310. The processing populates record 42 of new schema 40 based on the values of the two columns of the first record.

As mentioned above, the processing at S310 may include any one or more data transforms that are or become known. The output may be in any format, including but not limited to one or more database table records. In a case that the output comprises one or more database table records, the number of columns of the records may differ from the number of columns from which the values were acquired at S305, as shown in FIG. 4A. The data transforms may utilize any external applications and/or data sources, and may generate a same output for a given input.

Next, at S315, certain records of the set of records are identified which include the value of a column of the plurality of columns of the current record. With respect to the present example, records of table 20 are identified at S315 which include the value "Jeff". This identification may be facilitated by the dictionary (i.e., dictionary 22) associated with the column (i.e., F_Name). Specifically, the identification of S315 may simply consist of reading the metadata of the entry of dictionary 22 associated with the value "Jeff". As shown in FIG. 2B, the records identified at S315 are the records of rows 1 and 5.

At S320, next records of the set of records are identified which include the value of a next column of the plurality of columns of the current record. Again considering the present example, the acquired value of the next column is "Smith" and the dictionary associated with the next column (i.e., column L_Name) is dictionary 26. The metadata of the dictionary entry associated with the value "Smith" indicate that the value is included in the records of rows 1, 3 and 5.

An intersection is determined at S325 between the records identified at S315 and the records identified at S320. The intersection of the records of rows 1 and 5 and the records of rows 1, 3 and 5 is the records of rows 1 and 5.

At S330 it is determined whether the intersection includes the current record and one or more other records. Since in the present example the intersection includes the current record (of row 1) and another record (of row 5), the determination at S330 is positive and flow proceeds to S335.

It is determined at S335 whether additional columns of the current record exist. For example, in a case that table 20 included a third column, flow would continue to S340 to identify next records of the set of records which include the value of the third column of the current record. S340 would proceed as described above with respect to S320, using a dictionary associated with the third column, to identify the next records.

Then, at S345, an intersection would be determined between the prior-determined intersection (i.e., the intersection determined at S325) and the records identified at S340. It would then be determined at S330 whether this new intersection includes the current record and one or more other records and flow would proceed as described above. Therefore, if the record of row 5 was found at S340 to include the value of the hypothetical third column of the current record, the intersection determined at S345 would again consist of the records of rows 1 and 5 and flow would return to S335 to determine if additional columns remain to be evaluated. Flow therefore cycles through S330, S335, S340 and S345 as long as additional columns exist and as long as the successively-determined intersections continue to include at least one record other than the current record.

Figure 4B:
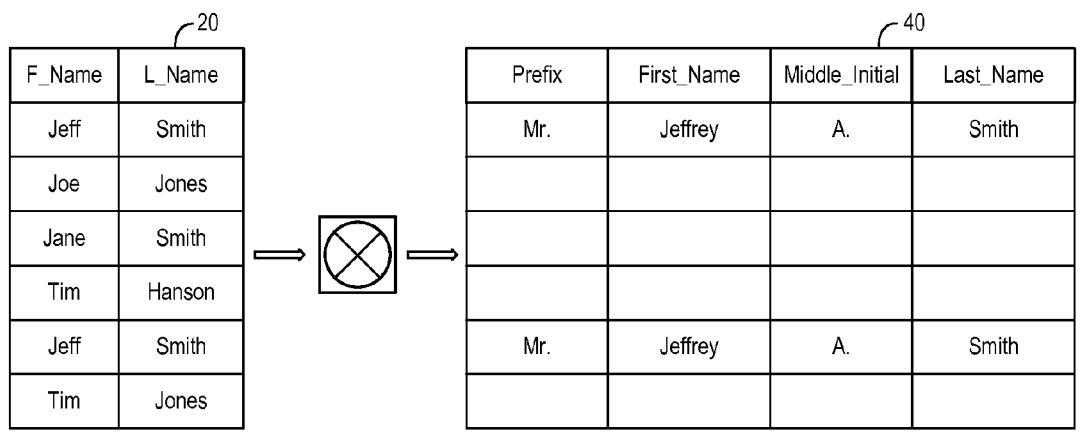

Returning to the present example, the initial determination at S335 is negative because table 20 includes no other columns. Flow therefore continues to S350, at which the output generated at S310 is associated with the plurality of columns of each other record of the most-recently determined intersection. This is the record of row 5 according to the present example, and the association of S350 is depicted in FIG. 4B. Advantageously, an output is determined for the record of row 5 without requiring execution of one or more transforms on the values of the record.

At S355, it is determined whether there are more records in the set of records which have not been associated with an output. FIG. 4B shows that the records of rows 2, 3, 4 and 6 are not associated with an output, so in this case flow returns to S305 to acquire values of the plurality of columns of a next record of the set of records.

Figure 4C:

The values "Joe" and "Jones" of the record of row 2 of table 20 may be acquired at S305. Flow then continues as described above to generate an associated output at S310, as shown in FIG. 4C, and to identify at S315, based on dictionary 22, that only the record of row 2 includes the value "Joe" in the column F_Name.

At S320, the records of rows 2 and 6 records are identified as including the value "Jones" in the column L_Name, based on the metadata associated with the entry "Jones" of dictionary 26. The intersection between the records identified at S315 (i.e., row 2) and the records identified at S320 (i.e., rows 2 and 6) is determined at S325 to be row 2. Since the intersection only includes the current record, flow proceeds from S330 to S355, where it is determined that the records of rows 3, 4 and 6 are not associated with an output.

Figure 4D:

Flow therefore returns to S305 and continues until the determination at S355 is negative. At this point, an output is associated with each record of the input set of records as shown in FIG. 4D. One or more records of the input set of records may be associated with an output which is simply copied, rather than independently-generated based on transforms.

Embodiments are not limited to the above examples of specific process flow. In some embodiments, the columns are analyzed in order of column cardinality. The cardinality (i.e., the number of unique values) of a column may be specified by metadata of a dictionary associated with the column. In this regard, dictionary 22 may be associated with metadata specifying a cardinality of four, while dictionary 26 may be associated with metadata specifying a cardinality of three.

For example, upon first executing S315, the examined column of the plurality of columns is a column having a greatest cardinality. This column, due to the number of distinct values therein, is typically the least-likely column to include a value matching the value of the column in the current record. The next column examined at S320 is the column having a next-greatest cardinality, which is typically the next-least-likely column to include a value matching the value of this particular column in the current record. By examining the columns in this order, the likelihood is increased that the intersection will be determined at S330 to include only the current record, allowing processing to move to a next record.

If the intersection is determined at S330 as including the current record and one or more other records, then the next column examined at S340 is a column having a next-greatest cardinality, and so on as flow cycles between S330-S345. As mentioned above, this implementation may accelerate the identification of unique records and therefore reduce overall processing time. In some embodiments, the foregoing may be facilitated by sorting the columns according to cardinality prior to S310.

Figure 5:
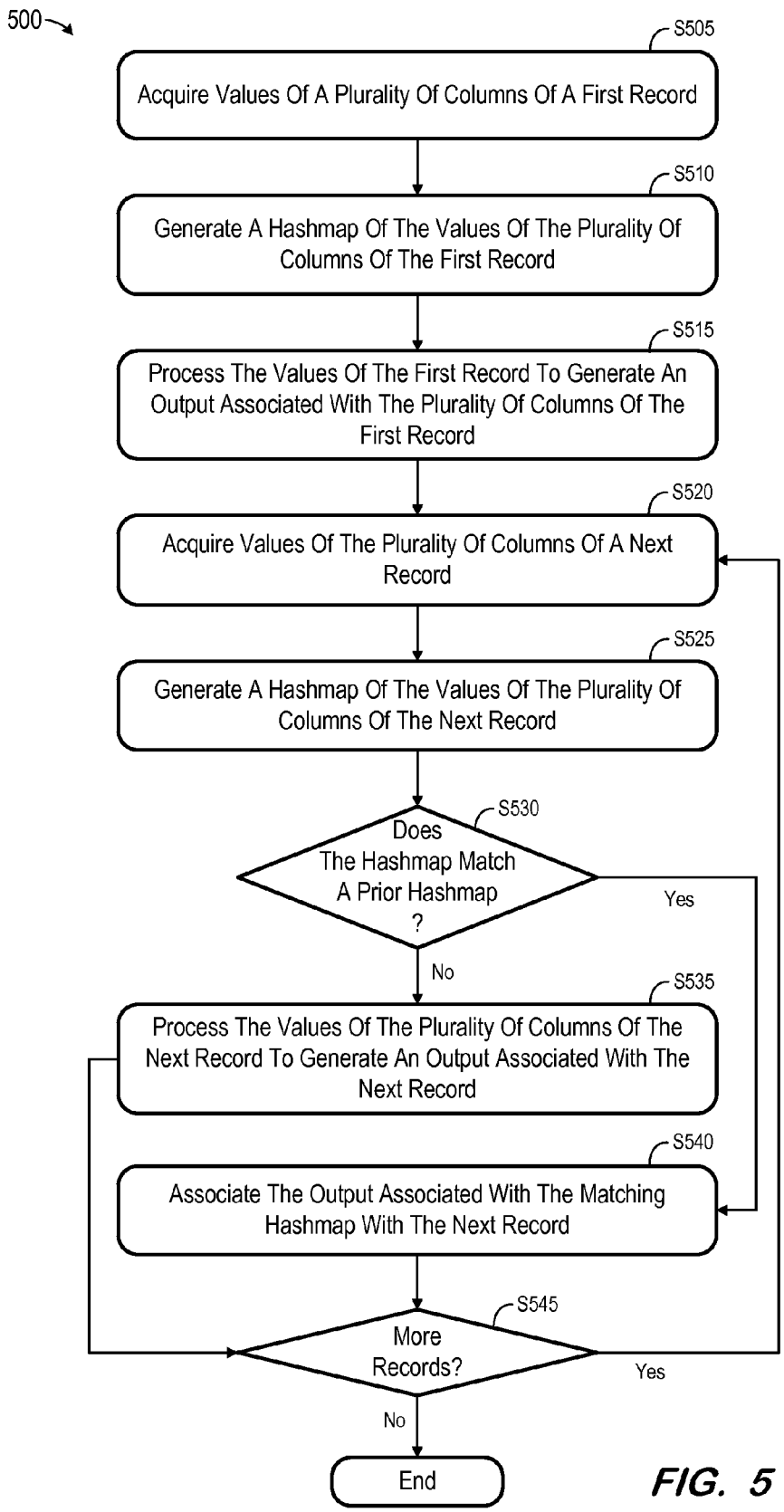
FIG. 5 is a flow diagram of a process according to some embodiments.

FIG. 5 illustrates process 500, which provides another technique to leverage previously-generated output records according to some embodiments. Similarly to S305 of process 300, values of a plurality of columns of a first record are acquired at S505. At S510, a hashmap of the values is generated. Any hash function may be used to generate the hashmap, and the input to the hash function may simply consist of a concatenated string of the values.

Next, as described with respect to S310, the values are processed to generate an output associated with the plurality of columns of the first record (S515). The values of the plurality of columns of a next record are acquired at S520, and a hashmap of these values is generated at S525. At S530, it is determined whether the hashmap generated at S525 matches any previously-generated hashmap. If not, the values of the next record are processed at S535 to generate an output associated with the plurality of columns of the next record. At S545, it is determined whether there are additional records to process. If so, flow returns to S520.

Figure 6:
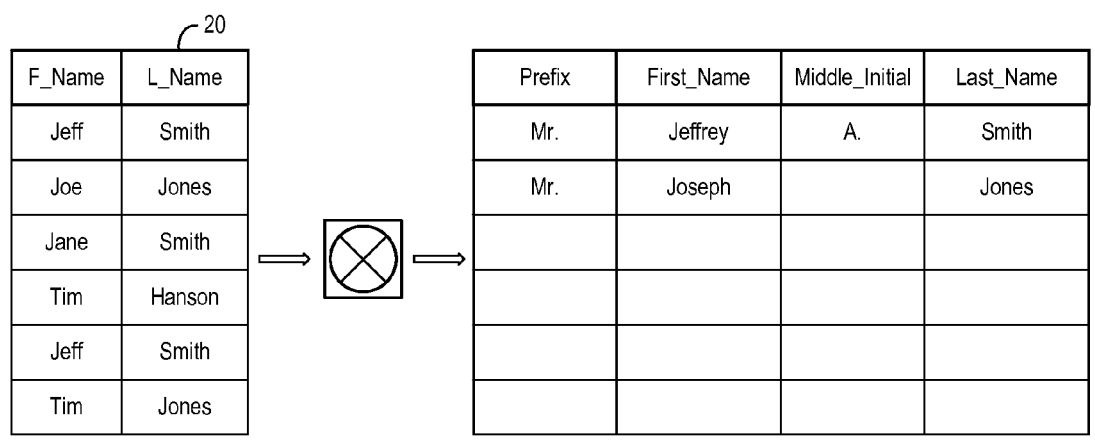
FIG. 6 illustrates data transformation according to some embodiments.

With respect to the example of FIG. 2A, a hashmap of "JeffSmith" may be determined at S510 and the values may be processed at S515 to generate an output as illustrated in FIG. 4A. A hashmap of the values of the next record (i.e., "JoeJones") is generated at S525 and it is determined that this hashmap does not match the prior hashmap. Accordingly, the values of the next record are processed to generate an output associated with the plurality of columns of the next record, as shown in FIG. 6.

Flow cycles through S525, S530, S540 and S545 to generate output associated with the records of table 20 until, at S530, it is determined that the generated hashmap generated based on the values of the record of row 5 matches a previously-generated hashmap. Therefore, at S540, the record of row 5 is associated with the output which is associated with the record of row 1. This avoids independent generation of output for the record of row 5, using an efficient method for comparing column values between records.

Figure 7:
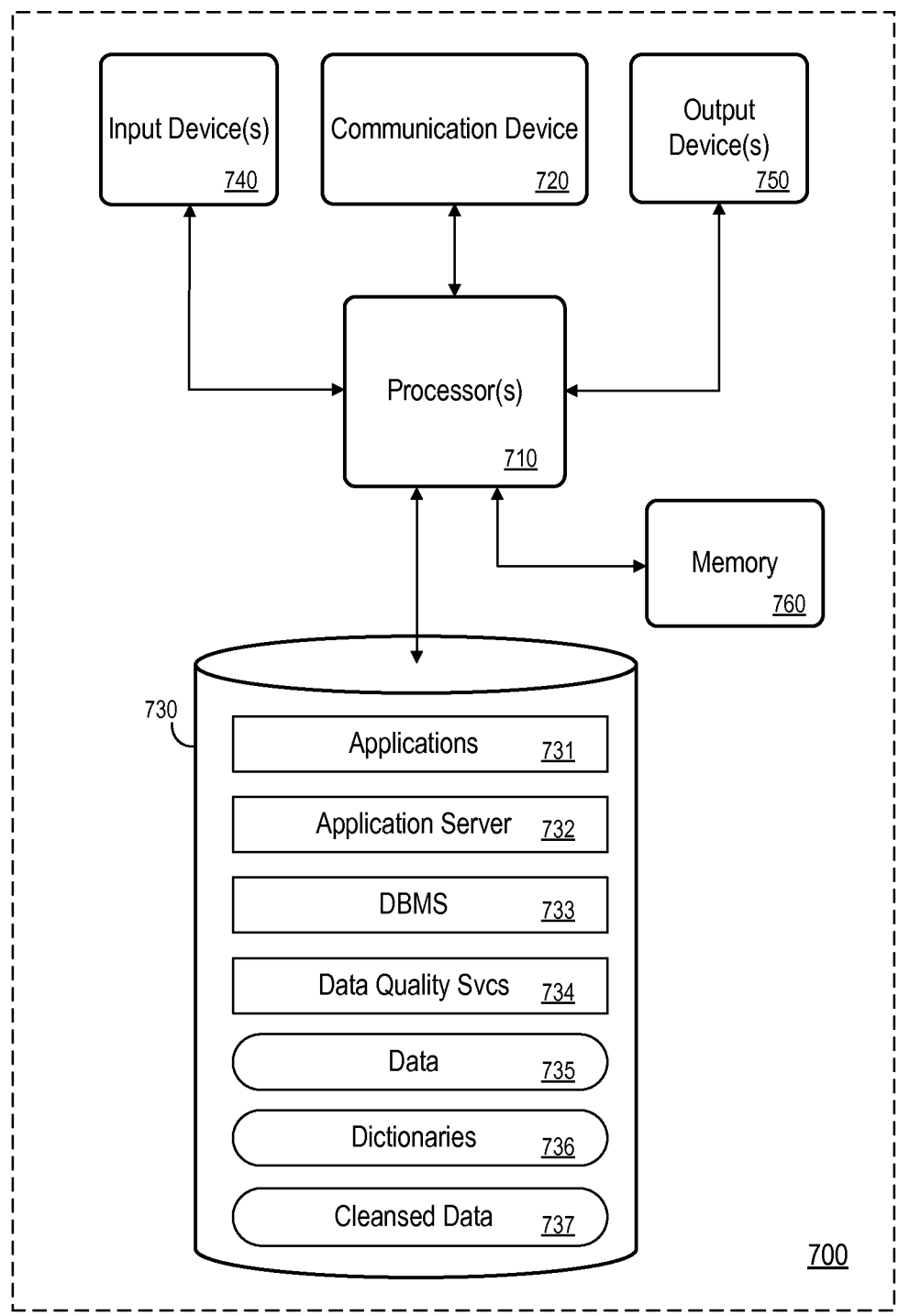
FIG. 7 is a block diagram of an apparatus according to some embodiments.

FIG. 7 is a block diagram of apparatus 700 according to some embodiments. Apparatus 700 may comprise a general-purpose computing apparatus and may execute program code to perform any of the functions described herein. According to some embodiments, apparatus 700 may comprise an implementation of database 110 and application server 130 of FIG. 1. Apparatus 700 may include other unshown elements.

Apparatus 700 includes processor 710 operatively coupled to communication device 720, data storage device 730, one or more input devices 740, one or more output devices 750 and memory 760. Communication device 720 may facilitate communication with external devices, such as a client, or an external data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM), Storage Class Memory (SCM) or any other fast-access memory.

Applications 731, application server 732, DBMS 733 and data quality services 734 may comprise program code executed by processor 710 to cause apparatus 700 to perform any one or more of the processes described herein. Embodiments are not limited to execution of these processes by a single apparatus.

Data 735 may comprise database tables storing data for one or more applications 731, warehoused data, and/or any other data desired to be stored. Dictionaries 736 include column values and associated metadata as described above. Cleansed data 737 may comprise data from data 735 which has been subjected to tone or more transforms as described above.

Data 735, dictionaries 736 and cleansed data 737 (either cached or a full database) may be stored in device 730 as shown and/or in volatile memory such as memory 760. Data storage device 730 may also store data and other program code for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
  a first memory storing a database table comprising a set of records;
  a second memory storing processor-executable process steps; and
  a processor to execute the processor-executable process steps to cause the system to:
    acquire values of a plurality of columns of a first record of the set of records;
    generate a first output based on the values;
    associate the first output with the first record;
    identify a first one or more records of the set of records which include the value of a first column of the plurality of columns of the first record;
    identify a second one or more records of the set of records which include the value of a second column of the plurality of columns of the first record;
    determine a first intersection of records between the first one or more records and the second one or more records;
    identify a third one or more records of the set of records which include the value of a third column of the plurality of columns of the first record;
    determine a second intersection of records between the first intersection of records and the third one or more records; and associate the first output with each record of the fourth one or more other records if the second intersection of records comprises the first record and a fourth one or more other records.

2. A system according to claim 1, wherein the database table comprises the plurality of columns and a second plurality of columns.

3. A system according to claim 1, wherein the output is a record having a second plurality of columns different from the first plurality of columns.

4. A system according to claim 1, the processor to further execute the processor-executable process steps to cause the system to:
acquire values of a second plurality of columns of the first record of the set of records;
generate a second output based on the values of the second plurality of columns;
associate the second output with the first record;
identify a fourth one or more records of the set of records which include the value of a first column of the second plurality of columns of the first record;
identify a fifth one or more records of the set of records which include the value of a second column of the second plurality of columns of the first record;
determine a third intersection of records between the fourth one or more records and the fifth one or more records;
identify a sixth one or more records of the set of records which include the value of a third column of the second plurality of columns of the first record; and
determine a fourth intersection of records between the first intersection of records and the third one or more records.

5. A system according to claim 4, the processor to further execute the processor-executable process steps to cause the system to:
associate the second output with each record of the seventh one or more other records if the fourth intersection of records comprises the first record and a seventh one or more other records.

6. A system according to claim 1, wherein identification of the first one or more records is based on first metadata associated with an entry of a first column dictionary associated with the first column, the entry comprising the value of the first column,
wherein identification of the second one or more records is based on second metadata associated with an entry of a second column dictionary associated with the second column, the entry comprising the value of the second column, and
wherein identification of the third one or more records is based on third metadata associated with an entry of a third column dictionary associated with the third column, the entry comprising the value of the third column.

7. A system according to claim 1, the processor to further execute the processor-executable process steps to cause the system to:
acquire values of the plurality of columns of a second record of the set of records;
generate a second output based on the values;
associate the second output with the second record;
identify a fourth one or more records of the set of records which include the value of the first column of the plurality of columns of the second record;
identify a fifth one or more records of the set of records which include the value of the second column of the plurality of columns of the second record;
determine a third intersection of records between the fourth one or more records and the fifth one or more records;
identify a sixth one or more records of the set of records which include the value of the third column of the plurality of columns of the second record; and
determine a fourth intersection of records between the third intersection of records and the sixth one or more records.

8. A system according to claim 1, the processor to further execute the processor-executable process steps to cause the system to:
associate the second output with each record of the seventh one or more other records if the fourth intersection of records comprises the second record and a seventh one or more other records.

9. A system according to claim 8, wherein identification of the first one or more records is based on first metadata associated with an first entry of a first column dictionary associated with the first column, the first entry comprising the value of the first column of the first record,
wherein identification of the second one or more records is based on second metadata associated with a second entry of a second column dictionary associated with the second column, the second entry comprising the value of the second column of the first record,
wherein identification of the third one or more records is based on third metadata associated with a third entry of a third column dictionary associated with the third column, the third entry comprising the value of the third column of the first record,
wherein identification of the fourth one or more records is based on fourth metadata associated with a fourth entry of the first column dictionary, the fourth entry comprising the value of the first column of the second record,
wherein identification of the fifth one or more records is based on fifth metadata associated with a fifth entry of the second column dictionary, the fifth entry comprising the value of the second column of the second record, and
wherein identification of the third one or more records is based on third metadata associated with a sixth entry of the third column dictionary, the sixth entry comprising the value of the third column of the second record.

10. A computer-implemented method comprising:
acquiring values of a plurality of columns of a first record of a set of records;
generating a first output based on the values;
associating the first output with the first record;
identifying a first one or more records of the set of records which include the value of a first column of the plurality of columns of the first record;
identifying a second one or more records of the set of records which include the value of a second column of the plurality of columns of the first record;
determining a first intersection of records between the first one or more records and the second one or more records;
identifying a third one or more records of the set of records which include the value of a third column of the plurality of columns of the first record;

determining a second intersection of records between the first intersection of records and the third one or more records; and associating the first output with each record of the fourth one or more other records if the second intersection of records comprises the first record and a fourth one or more other records.

11. A method according to claim 10, wherein the database table comprises the plurality of columns and a second plurality of columns.

12. A method according to claim 10, wherein the output is a record having a second plurality of columns different from the first plurality of columns.

13. A method according to claim 10, further comprising:
acquiring values of a second plurality of columns of the first record of the set of records;
generating a second output based on the values of the second plurality of columns;
associating the second output with the first record;
identifying a fourth one or more records of the set of records which include the value of a first column of the second plurality of columns of the first record;
identifying a fifth one or more records of the set of records which include the value of a second column of the second plurality of columns of the first record;
determining a third intersection of records between the fourth one or more records and the fifth one or more records;
identifying a sixth one or more records of the set of records which include the value of a third column of the second plurality of columns of the first record; and
determining a fourth intersection of records between the first intersection of records and the third one or more records.

14. A method according to claim 13, the method further comprising:
associating the second output with each record of the seventh one or more other records if the fourth intersection of records comprises the first record and a seventh one or more other records.

15. A method according to claim 10, wherein identification of the first one or more records is based on first metadata associated with an entry of a first column dictionary associated with the first column, the entry comprising the value of the first column,
wherein identification of the second one or more records is based on second metadata associated with an entry of a second column dictionary associated with the second column, the entry comprising the value of the second column, and
wherein identification of the third one or more records is based on third metadata associated with an entry of a third column dictionary associated with the third column, the entry comprising the value of the third column.

16. A method according to claim 10, further comprising:
acquiring values of the plurality of columns of a second record of the set of records;
generating a second output based on the values;
associating the second output with the second record;
identifying a fourth one or more records of the set of records which include the value of the first column of the plurality of columns of the second record;
identifying a fifth one or more records of the set of records which include the value of the second column of the plurality of columns of the second record;
determining a third intersection of records between the fourth one or more records and the fifth one or more records;
identifying a sixth one or more records of the set of records which include the value of the third column of the plurality of columns of the second record; and
determining a fourth intersection of records between the third intersection of records and the sixth one or more records.

17. A method according to claim 10, the method further comprising:
associating the second output with each record of the seventh one or more other records if the fourth intersection of records comprises the second record and a seventh one or more other records.

18. A method according to claim 17, wherein identification of the first one or more records is based on first metadata associated with an first entry of a first column dictionary associated with the first column, the first entry comprising the value of the first column of the first record,
wherein identification of the second one or more records is based on second metadata associated with a second entry of a second column dictionary associated with the second column, the second entry comprising the value of the second column of the first record,
wherein identification of the third one or more records is based on third metadata associated with a third entry of a third column dictionary associated with the third column, the third entry comprising the value of the third column of the first record,
wherein identification of the fourth one or more records is based on fourth metadata associated with a fourth entry of the first column dictionary, the fourth entry comprising the value of the first column of the second record,
wherein identification of the fifth one or more records is based on fifth metadata associated with a fifth entry of the second column dictionary, the fifth entry comprising the value of the second column of the second record, and
wherein identification of the third one or more records is based on third metadata associated with a sixth entry of the third column dictionary, the sixth entry comprising the value of the third column of the second record.

* * * * *